C. W. REYNOLDS.
STORAGE RECEPTACLE FOR FROZEN CONFECTIONS.
APPLICATION FILED JUNE 21, 1909.
962,527.
Patented June 28, 1910.
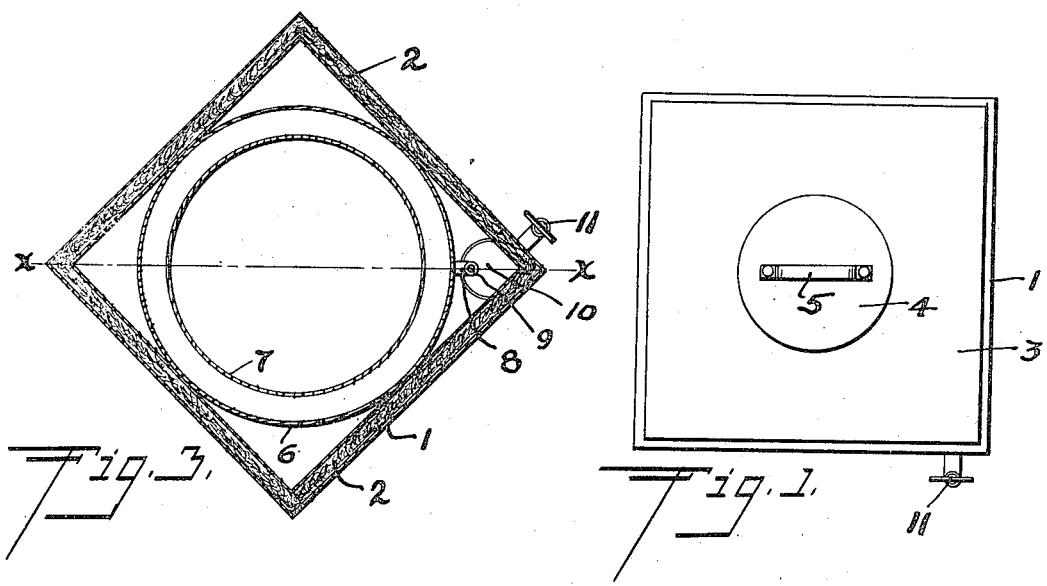
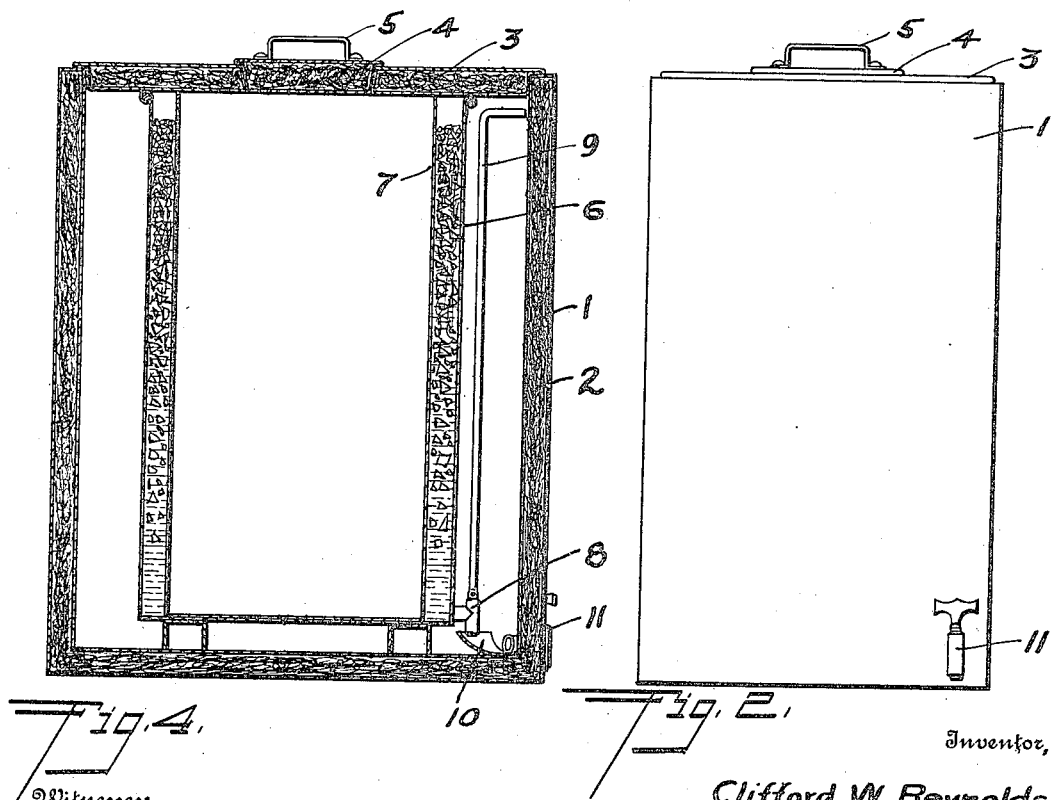
Inventor,
Clifford W. Reynolds.
By David O. Barnell,
Attorney.

UNITED STATES PATENT OFFICE.

CLIFFORD W. REYNOLDS, OF OMAHA, NEBRASKA.

STORAGE-RECEPTACLE FOR FROZEN CONFECTIONS.

962,527.

Specification of Letters Patent.  Patented June 28, 1910.

Application filed June 21, 1909. Serial No. 503,558.

*To all whom it may concern:*

Be it known that I, CLIFFORD W. REYNOLDS, a citizen of the United States, and a resident of Omaha, in the county of Douglas and State of Nebraska, have invented certain new and useful Improvements in Storage-Receptacles for Frozen Confections, of which the following is a specification.

My invention relates to cabinets for storing and preserving ice cream and the like in such manner that portions thereof may be readily removed from the receptacle when desired for use.

It is the object of my invention to provide in an article of this kind a construction such that the same may be easily cleansed and kept in a sanitary condition, in which the parts that become worn may be cheaply replaced, in which the materials inclosed are effectively protected and insulated to prevent the absorption of heat thereby, and in which the means for draining the liquid from the refrigerating mixture are so arranged that the drain will not be clogged and rendered inoperative by the formation of frost at the outlet thereof.

A structure embodying my invention is illustrated in the accompanying drawings, in which—

Figure 1 is a plan view thereof, Fig. 2 is a side elevation, Fig. 3 is a horizontal sectional view, and Fig. 4 is a vertical sectional view taken on the plane of the line $x$—$x$ of Fig. 3.

In carrying out my invention I provide a rectangular outer casing or cabinet 1, preferably made of sheet metal and having double walls between which is a packing 2 of suitable insulating material such as mineral wool. The upper end of the cabinet is closed by a lid 3 made with double walls similarly to the sides and bottom of the cabinet. In the center of the lid 3 is a circular opening, slightly tapered, in which is fitted a secondary lid or cover 4 which is provided with a handle 5.

Within the rectangular casing 1 is removably disposed a cylindrical sheet-metal vessel 6 of a size such that it will fit easily therein touching the centers of the side walls so as to be held against lateral displacement. The said vessel is supported slightly above the bottom of the cabinet by short legs, as shown, and the height thereof is such that the upper edge thereof will adjoin the lid 3. A second cylindrical vessel 7 is disposed within the vessel 6, the same being of such a diameter that an annular space is left between the walls thereof and of the outer vessel, and the height being such that the upper edge will adjoin the lid 3, as shown. The vessel 7 forms the receptacle for the materials to be preserved in the cabinet, and access to the vessel for removal of portions of its contents is afforded by the secondary lid or cover 4. The annular space between the vessels 6 and 7 is filled with a refrigerating mixture such as ice and salt.

For the purpose of removing from the vessel 6 the waste liquid from the refrigerating mixture, a cock 8 is provided at the lower end thereof and adjoining one of the corners of the outer casing or cabinet. From the cock 8 an operating rod 9 is extended upwardly to a point adjoining the lid 3 so that the cock may be conveniently opened and closed from the top of the cabinet. In the corner of the cabinet below the cock 8 is arranged a cup 10 from which a tube extends through the side of the cabinet and at the outer end thereof is provided with a cock 11. In draining off the liquid from the vessel 6 the outer cock 11 is first opened and then the inner cock 8. The outer cock is made of larger size than the inner so that there will be no danger of overflowing the cup 10 by supplying the liquid thereto faster than it can run off through the outer cock. After the draining is completed the inner cock is first closed and then the outer.

It will be observed that by the arrangement disclosed there is no liability of the drain being rendered inoperative by the formation of frost at the outlet thereof. The air in contact with the inner cock, being inclosed within the cabinet, is kept dry and any moisture precipitated therefrom will be distributed as frost over the surface of the vessel 6 and not accumulate at the cock so as to clog the same. The outer cock, not being normally in contact with the cold liquid, remains at a temperature sufficiently high that no frost will form thereon, as would be the case were the liquid in contact therewith.

The vessels 6 and 7 both being removable from the cabinet, the same may be easily and thoroughly cleansed and kept in sanitary condition. The said vessels receive all the wear resulting from packing the refrigerating mixture therein and from the packing and removal of the materials to be preserved, while the outer casing receives hardly any wear and will last indefinitely. As the inner vessels may be cheaply replaced, the structure presents economical advantages over structures which are worthless when any part thereof is worn out. By combining the rectangular outer casing with the inner cylindrical vessel a two-fold insulating space is provided except at the centers of the sides where the vessel 6 contacts with the inner wall of the casing.

Now, having described my invention, what I claim and desire to secure by Letters Patent is:

1. In a storage receptacle of the class described, an outer insulating casing, a vessel removably disposed within the casing and having portions thereof spaced from the inner wall of the casing, a second vessel removably disposed within the first so as to form a space between them for receiving a refrigerating mixture, a drain cock connected with the first vessel near the bottom thereof and in the space between the same and the outer casing, an operating element extending from said cock to the top of the space between said vessel and outer casing, a cup arranged to receive liquid from said cock, and an outer cock controlling a passage from said cup to the outside of the outer insulating casing.

2. In a storage receptacle of the class described, a rectangular outer insulating casing, a cylindrical vessel removably disposed within the casing, a second vessel removably disposed within the first and arranged to form a space between them, a drain cock connected with said cylindrical vessel and opening into the space between the same and the outer casing, a means for receiving liquid from said cock, and an outer cock controlling a passage from said receiving means to the outside of the outer casing.

3. In a storage receptacle of the class described, a rectangular outer insulating casing, a vertical cylindrical vessel removably disposed within the casing, a second vessel removably disposed within the first and arranged to form a space between them, a drain cock connected with said cylindrical vessel at the bottom thereof and adjacent to one corner of the casing, said cock opening into the space between said cylindrical vessel and the outer casing, an operating element extending from the cock to the top of said space, a means for receiving liquid from said cock, and an outer cock controlling a passage from said receiving means to the outside of the outer casing.

In testimony whereof I have hereunto subscribed my name in the presence of two witnesses.

CLIFFORD W. REYNOLDS.

Witnesses:
   Roy G. Kratz,
   D. O. Barnell.